US008868570B1

(12) United States Patent
Skut et al.

(10) Patent No.: US 8,868,570 B1
(45) Date of Patent: Oct. 21, 2014

(54) SELECTION AND DISPLAY OF ONLINE CONTENT ITEMS

(75) Inventors: Wojciech W. Skut, Zurich (CH); Lars Engebretsen, Zurich (CH)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 13/160,129

(22) Filed: Jun. 14, 2011

(51) Int. Cl.
*G06F 7/00* (2006.01)
*G06F 17/30* (2006.01)

(52) U.S. Cl.
CPC .................................. *G06F 17/3097* (2013.01)
USPC ............................................ 707/749; 706/45

(58) Field of Classification Search
USPC ................................................. 707/749, 748
See application file for complete search history.

(56) References Cited

U.S. PATENT DOCUMENTS

| | | | | |
|---|---|---|---|---|
| 2009/0006207 A1* | 1/2009 | Datar et al. | ...................... | 705/14 |
| 2009/0216719 A1* | 8/2009 | Coffman et al. | .................. | 707/3 |
| 2011/0219015 A1* | 9/2011 | Kim et al. | ..................... | 707/768 |

OTHER PUBLICATIONS

Radlinski et al., "Optimizing Relevance and Revenue in Ad Search: A Query Substitution Approach", 2008, ACM.*
Zhang et al.,"Comparing Click Logs and Editorial Labels for Training Query Rewriting", 2007.*
Hillard et al., "Improving Ad Relevance in Sponsored Search", 2010, ACM.*
F. Radlinski, T. Joachims, Active Exploration for Learning Rankings from Clickthrough Data, Proceedings of the ACM Conference on Knowledge Discovery and Data Mining (KDD), ACM, 2007.

* cited by examiner

*Primary Examiner* — James Trujillo
*Assistant Examiner* — Dawaune Conyers
(74) *Attorney, Agent, or Firm* — Fish & Richardson P.C.

(57) ABSTRACT

This specification describes technologies relating to displaying online content. In general, one aspect of the subject matter described in this specification can be embodied in methods that include receiving a first query associated with a user request. The methods may further include determining a score for a word in the first query based at least in part on user interaction with a content item served for display in response to a past query that includes the word. The methods may further include selecting a keyword derived from the first query based at least in part on the score. The methods may further include identifying candidate content items using the selected keyword. Other embodiments of this aspect include corresponding systems, apparatus, and computer program products.

34 Claims, 5 Drawing Sheets

SELECTION AND DISPLAY OF ONLINE CONTENT ITEMS

TECHNICAL FIELD

This disclosure relates to selection and display of online content items.

BACKGROUND

The Internet provides access to a wide variety of resources. For example, video and/or audio files, as well as web pages for particular subjects or particular news articles, are accessible over the Internet. Access to these resources presents opportunities for content items (e.g., advertisements) to be provided for presentation to a user with the resources. The pairing of content items with requested resources can generate value by increasing the likelihood that users will interact with content items. For example, a web page can include content slots in which advertisements or other content items (e.g., search result snippets) can be presented. These content slots can be defined in the web page or defined for presentation with a web page, for example, in a pop-up window.

SUMMARY

Technologies relating to selection and display of online advertisements are described. In general, one aspect of the subject matter described herein can be embodied in a method that includes receiving a first query associated with a user request and determining a score for a word in the first query based at least in part on user interaction with a content item served for display in response to a past query that includes the word. The method may further include selecting a keyword derived from the first query based at least in part on the score. The method may further include identifying candidate content items using the selected keyword. Other embodiments of this aspect include corresponding system, apparatus, and computer program products.

These and other embodiments can each optionally include one or more of the following features. The keyword may be derived from the first query in part by dropping the word from the first query. One of the candidate content items that matches the keyword may be selected. Information reflecting the one of the candidate content items may be transmitted to a user device. One of the candidate content items may be an advertisement. One of the candidate content items may be a search result snippet. The score may be determined in part by determining a first count of clicks on content items that were associated with keywords derived from the past query that include the word and determining a second count of clicks on content items that were associated with keywords derived from the past query by dropping the word. The score may be determined in part by determining a ratio of the first count to the second count. The score may be determined in part by determining a first click through rate for a first keyword derived from the past query that included the word and determining a second click through rate for a second keyword derived from the past query by dropping the word. The second click through rate may be determined in part by dividing the a first count of clicks on content items that were associated with the second keyword by a second count of the number of content items that were associated with the second keyword and transmitted to a user device. The score may be determined in part by determining a first average click through rate for keywords derived from the past query that included the word and determining a second average click through rate for keywords derived from the past query by dropping the word. The score may be determined in part by determining a ratio of the first average click through rate to the second average click through rate. The score may be determined in part by determining a first count of clicks on content items that were associated with single word keywords derived from the past query that include the word and determining a second count of clicks on content items that were associated with single word keywords derived from the past query by dropping the word. The score may be determined in part by determining a ratio of the first count to the second count.

Particular embodiments of the invention can be implemented to realize none, one, or more of the following advantages. A metric for measuring the significance of individual words in search queries may be provided. The metric can facilitate efficient and effective search by focusing the search on the most significant words in a query (e.g., words associated with content items that most likely to be of interest to a user submitting the query). Searching for content using keywords derived from a query using this information about the significance of words in the query may result in more focused and relevant lists of matching content items. Providing more relevant search results may increase the chances of clicks and conversions and increase value of a search service to users, content publishers, advertisers, and content aggregators.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
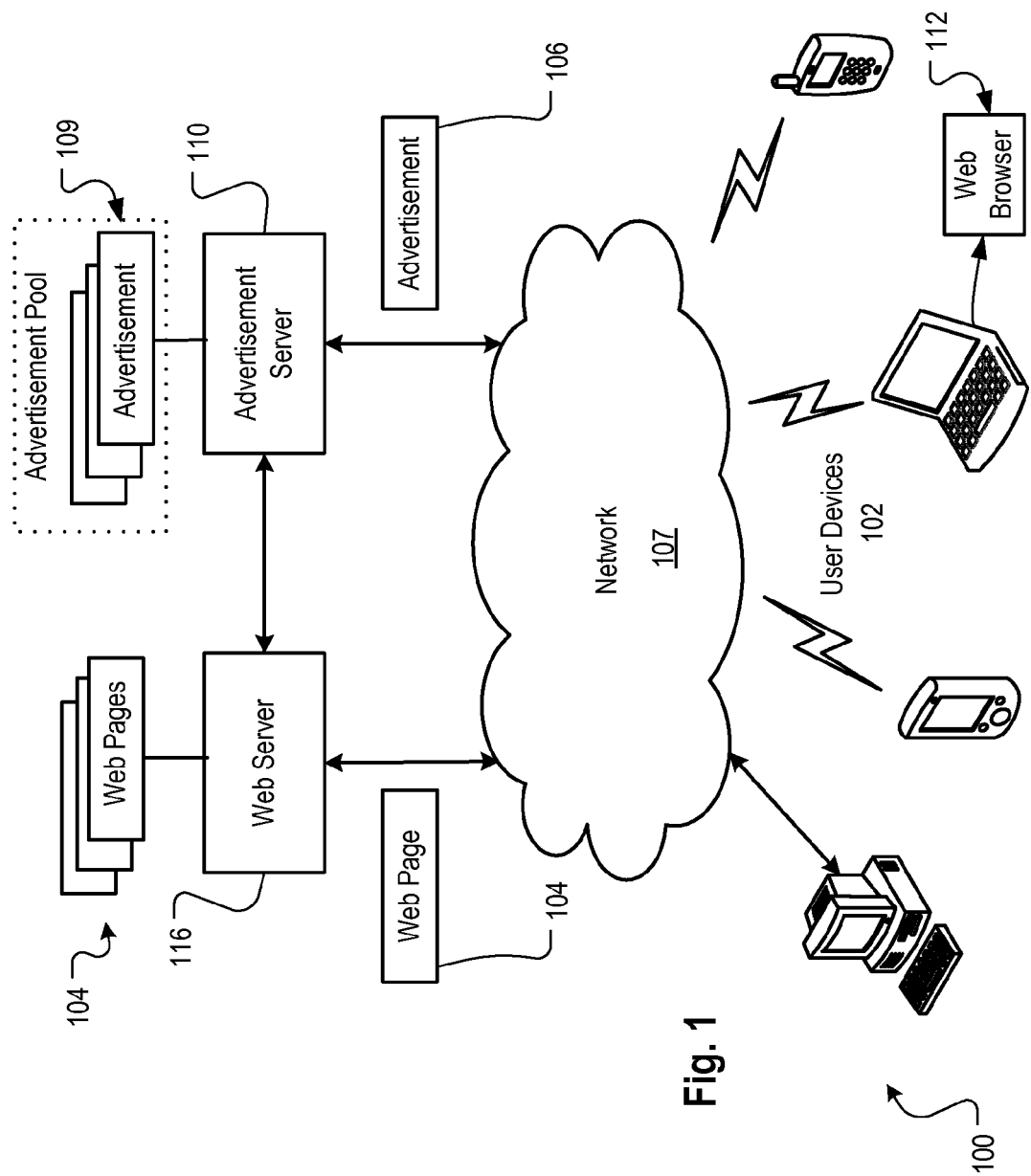
FIG. 1 is a block diagram of an example online environment.

In some implementations, a word-score for a word occurring in a query may be used to derive and/or select relevant keywords for the query. The keywords may be used to identify content items (e.g., advertisements) relevant to the query. One or more of the content items may be paired with online resources provided to a user in response to a user request associated with the query.

A "word" associated with a word-score may take a variety of forms. In some implementations, the words tracked are each an arbitrary character string delimited by spaces, punctuation, or other designated delimiting characters or symbols. For example, word-scores may be determined for words occurring in dictionary and may also be determined for misspellings of words that commonly occur in queries. In some implementations, the words tracked may include compound words or phrases (e.g. New York), i.e. commonly occurring sequences of simple words, and include internal spaces or other delimiting characters or symbols. In some implementations, the words tracked may include symbols (e.g. Chinese characters or common sequences of Chinese characters) that are not delimited by designated delimiting characters or symbols. In some implementations, word-scores are maintained for related groups of words including canonicalized forms of words, i.e. word stems, instead of word forms (e.g. a word-score for "child" may determined and used for occurrences of both "child" and "children").

The word-score is a metric associated with the word that is indicative of the word's typical significance to the meaning of queries. The word-score may be determined based on data reflecting past user interactions with content items associated with keywords derived from queries including the word. The associated keywords may have kept the word or they may have dropped the word. For example, keywords derived from the query "cheap car rentals" by keeping the word cheap may include the keyword "cheap", the keyword "cheap rentals", the keyword "cheap car", the keyword "cheap car rentals", or other permutations of the words of the query including "cheap" or rewrites of those words. For example, keywords derived from the query "cheap car rentals" by dropping the word cheap may include the keyword "car", the keyword "rentals", the keyword "car rentals", or other permutations of the words of the query other than "cheap" or rewrites of those words. A high rate of past user interactions with content items associated with keywords that kept the word may indicate that the word is significant to the meanings of queries. A high rate of past user interactions with content items associated with keywords that dropped the word may indicate that the word is not significant to the meanings of queries. The word-score may be based on statistics of past user interactions that indicate the rate at which users have interacted with keywords that kept the word and the rate at which users have interacted with keywords that dropped the word. Unlike scores for words based purely on frequency of word occurrence in a set of documents (e.g. inverse document frequency), the word-score may account for user behavior, word misspellings and situations in which a word is actually more relevant than its frequency suggests (e.g., based on commercial value).

An online content delivery service may provide content items (e.g., advertisements or search result snippets) for presentation to a user in response to a request for content associated with a query. A query may be a text string and may include one or more words. In some implementations, a query may be supplied by a user, for example in the form of text based search query submitted through a webpage. In some implementations, a query may be associated with an online resource (e.g., a webpage, audio, video, etc.) that is selected by a user. For example, a streaming video resource may have associated meta-data, including a text string that includes information related to the content of the video. This associated text string may be treated as query for the purpose of identifying content items (e.g., advertisements) most relevant to the requested video resource that may be paired with the resource for presentation to a user.

The value of a particular resource request to an online resource provider may correspond to the value to the resource provider of the presentation of one or more content items to a user in response to the resource request. For example, a request for an online resource may correspond to opportunities for providing one or more content items (e.g., sponsored content items, such as advertisements) to a user that initiated the request. An opportunity to pair a content item with other content in the requested resource and provide the content item to a user for presentation in response to the request may be referred to as a content slot or an impression. Thus, each resource request represents one or more impressions that may each be allocated to a content item (e.g., an advertisement) that is selected to be provided in response to the resource request. The value of allocating an impression to a particular content item may depend on how a user is likely to react to presentation of the content item in the context of the impression.

The value of an allocation may be estimated based on information about the impression and the content item. For example, relevant information about an impression may include information about other content in the requested resource (e.g., keywords), the time of the request, and data about the user who made the request (e.g., cookies or geographic location). A content or advertisement allocation system may seek to allocate impressions to content items in a manner that maximizes the estimated value of the allocations.

A content delivery service may attempt to identify content items that are most relevant to content or online resources requested by a user. In some implementations, content items eligible or well suited to be paired with a request for content may be identified by searching a collection of content items using one or more keywords derived from a query associated with the request for content. Content items that are eligible to be provided to a user device and match a keyword are candidate content items. These candidate content items may be further evaluated using quality scores (e.g., a predicted click through rate) as metric for relevance to the request for content that may be used to rank the candidate content items. Ranked candidate content items may be selected for provision to a user device for presentation to the user along with other content, such as an online resource requested by the user. Because a relevant content item is likely to be interacted with (e.g., clicked on) by a user, a higher score indicates a higher likelihood that the candidate content item will be interacted with if displayed on a web page (e.g., a web page displaying search results). The quality score may be based on other factors, such as the relevance and quality of a web page liked to by the candidate content item.

When keywords are used to identify matching or candidate content items the manner in which the keywords are derived from the query can significantly impact the performance of a content delivery service. In a keyword based content delivery system (e g, running on an advertising server), candidate content items are retrieved based on keywords. A keyword can be a sequence of one or more words associated with a content item that characterizes queries that the content item should be paired with. Content items may be associated with one or more keywords. When a request for content associated with a query is received, the system may analyze the query to derive one or more keywords. A collection of content items may then be searched for content items associated with a keyword that matches one of the one or more derived keywords. The matching content items become candidate content items. Keywords may be derived from a query in a variety of ways. In some implementations, deriving a keyword from a query may involve dropping one or more of the words in the query or rewriting some words in the query. For example, from the query 'cheap car rentals' the keyword 'rent car' could be derived by dropping the word 'cheap', rewriting 'rental' to 'rent', and reordering the words. While 'cheap' can be dropped from the query without radically altering its meaning, dropping 'rentals' or 'car' alters the meaning of the query significantly. In other words, 'cheap' is less relevant to the meaning of the query than are 'car' or 'rental'. There may be many possible keywords that could be derived from even a simple query. Deriving and selecting the most relevant keywords may significantly enhance the efficiency and performance of a keyword based content delivery system by leading to more focused and relevant lists of candidate content items.

The derivation and selection of keywords from a query may be facilitated using a metric or score that is indicative of the typical significance of individual words to the meaning of a query. In some implementations, a score for certain words or groups of related words (e.g., 'rent' and 'rental') may be maintained by a content delivery system and used to evaluate or filter keywords derived from a query before they are used to identify candidate content items. The score may be a metric that generally reflects the significance of the word to the meaning of a query. The score for a word may be derived from data regarding past user interactions with content items associated with keywords including or omitting the word. For example, if content items associated with keywords that include the word are often clicked on or otherwise interacted with by users when presented in response to a query including the word, then the word is likely significant to the meaning of queries. If content items associated with keywords that omit the word are often clicked on or by users when presented in response to a query including the word, then the word is likely less significant to the meaning of queries.

Selection of a content item for presentation in response to a resource request is interchangeably referred to as allocation of an impression to the selected content item (e.g., an advertisement).

A conversion occurs when a user performs a particular action related to an advertisement provided with a resource or search results page. What constitutes a conversion may vary from case to case and can be determined in a variety of ways. For example, a conversion may occur when a user clicks on an advertisement, is referred to a web page, and consummates a purchase there before leaving that web page. A conversion can also be defined by an advertiser to be any measurable/observable user action such as, for example, downloading a white paper, navigating to at least a given depth of a website, viewing at least a certain number of web pages, spending at least a predetermined amount of time on a website or web page, registering on a website, etc. Other actions that constitute a conversion can also be used.

A click through rate for a content item (e.g., an advertisement) may be defined as the number of user clicks on the content item divided by the number of impressions (i.e. showings to users) that the content item has been allocated. An aggregate click through rate for multiple content items may be the sum of all clicks on qualified content items divided by the total numbers of impressions allocated to all qualified content items. A click through rate for a keyword may be defined as the number of clicks on content items that were associated with the keyword divided by the number of impressions allocated to content items that were associated with the keyword. In other words, a click through rate for a keyword may be defined as an aggregate click through rate for content items associated with the keyword. A click through rate for keyword may also be defined as an average of click through rates for content items associated with the keyword.

A predicted click through rate for a content item may be an estimate of the future click through rates for a content item and may be based in part on data reflecting past user interactions with the content item or similar content items in similar impressions. For example, a predicted click through rate may be generated using a machine learning system to process data reflecting past user interactions, among other information, and estimate or predict future click through rates.

A content item is any data that can be provided over a network to cause a visual and/or auditory presentation on a user device. In some implementations a content item may include the presentable content itself (e.g., a picture, a video, or an audio file). In some implementations a content item may include instructions or other information (e.g., a pointer) that causes presentable content to be loaded or retrieved (e.g., from a remote server). The processes described below are illustratively applied to content items that are advertisements provided in response to a request from an online resource, but the processes are also applicable to other content items provided over a network. Additionally, the description that follows describes the advertisements being selected by an allocation subsystem that is implemented as an element of an advertisement server. However, the allocation subsystem can be implemented as an independent system that communicates directly, or over a network, with the advertisement server or another data processing apparatus.

FIG. 1 is a block diagram of an example online environment (100). The online environment (100) facilitates the serving of content items for display on user devices (102). For example, content items can include web pages (104) and advertisements (106) (e.g., advertisements related to the web pages (104)).

Web pages (104) and advertisements (106) can be provided to user devices (102) through a network (107). Network (107) can be a wide area network, local area network, the Internet, or any other public or private network, or combination of both. User devices (102) can connect to web server (116) (or the advertisement server (110)) through the network (107) using any device capable of communicating in a computer network environment and displaying retrieved information. Example user devices (102) include a web-enabled handheld device, a mobile telephone or smartphone, a tablet device, a set top box, a game console, a personal digital assistant, a navigation device, or a computer.

For example, web pages (104) can be provided by a web server (116) for display on a user device (102), and advertisements (106) can be provided by an advertisement server (110) for display on the user device (102). In some implementations, the advertisements (106) are provided directly to the web server (116) by the advertisement server (110), and the web server (116) then provides the advertisements (106) to the user devices (102) in association with one or more particular web pages (104), e.g., web pages related to the advertisements (106). In some implementations, the web server (116) queries the advertisement server (110) for advertisements (106) related to one or more particular web pages (104), and the advertisement server (110) evaluates a pool (109) of advertisements and chooses one or more advertisements (106) that are related to the web pages (104), e.g., advertisements that pertain to subject matter referenced by or described within the web pages (104). The advertisements (106) can be displayed with the web page (104) on a web browser (112) of a user device (102). The advertisements (106) can also be requested as part of the delivery of a web page (104) in response to a user device (102) requesting the web page (104) from a web server (116).

Figure 2:
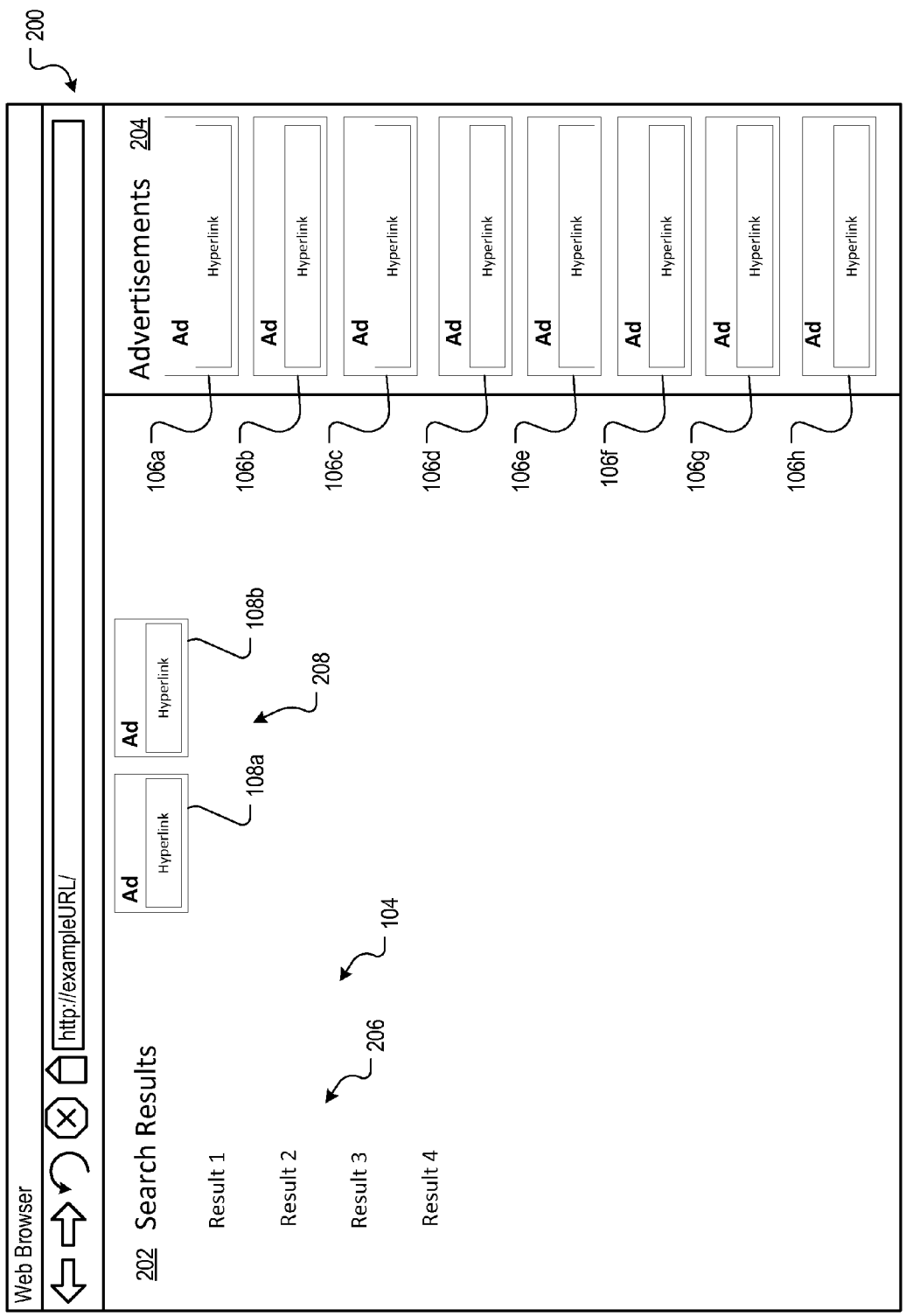
FIG. 2 is an example of a web browser displaying example online content, including advertisements.

FIG. 2 is an example of a web browser interface (200) displaying online content, including advertisements. The web browser interface (200) includes a browsing portion (202) for displaying requested content (e.g., a web page (104) or search results presented in response to a user-entered query) and an advertisement portion (204), e.g., for displaying advertisements (106a-h) related to the web page or search request. In the example shown, the web page (104) is a presentation of search results (206) representing references (e.g., hyperlinks to uniform resource locators) to other web pages selected by a search engine (not shown) to be related to a user query previously entered by a user of the web browser interface (200). The advertisements 106a-h have been identified (e.g., by an advertisement server (110) as shown in FIG. 1) in response to the particular content displayed within the web page (104). For example, the advertisements (106a-h) can be associated with keywords that also appear in the search results (206), or the advertisements (106a-h) can contain links to another web page (e.g., hyperlinks to a uniform resource locator of the web page). Advertisements that are relevant to the content of a web page may be more likely to be of interest to a user viewing the web page, and more likely to be followed up upon by the user (e.g., leading to the user clicking on the advertisement, submitting a product inquiry, or engaging in a commercial transaction solicited by an advertisement).

In some implementations, advertisements can appear in multiple locations within web browser interface (200). For example, in addition to advertisements (106a-h) displayed along an advertisement portion (204) on the right-hand side of web browser interface (200), other advertisements (108a-b) can be displayed in another advertisement portion (208) in an upper area of web browser interface (200). In some examples, advertisements are displayed in a lower area of web browser interface (200) or on the left-hand side of web browser interface (200).

Advertisements (106a-h) displayed in web browser interface (200) can be chosen, e.g., by an advertisement server (110) (FIG. 1), based on a quality score associated with the advertisements. For example, an advertisement server can identify many possible candidates to display in web browser interface (200) based on the degree to which the advertisement candidates are related to the content displayed in the web browser, e.g., the search results (206). The advertisement server can then select one or more advertisements from the advertisement candidates for display.

Figure 3:
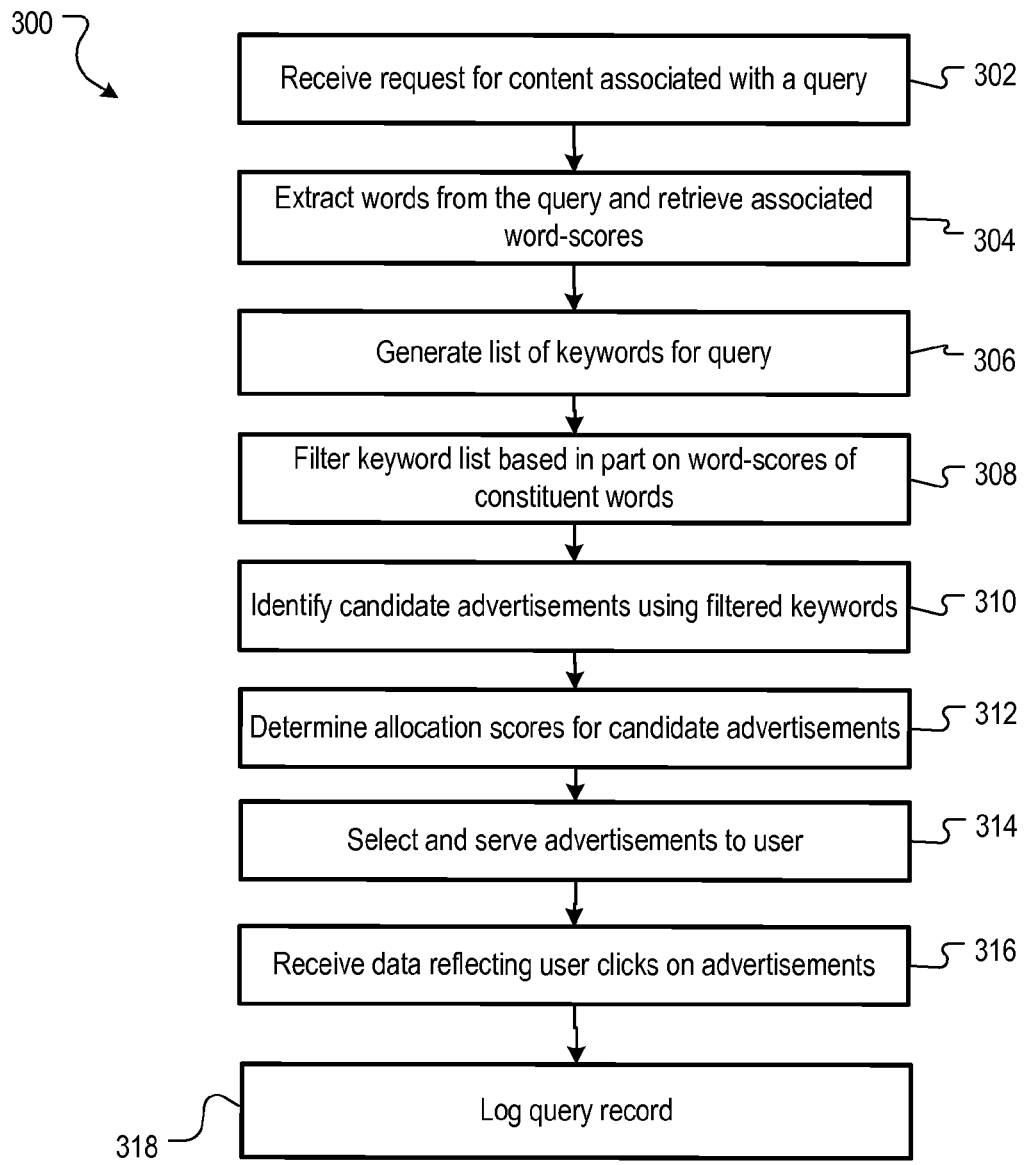
FIG. 3 is a flowchart of an example process for providing a content item in response to a request.

FIG. 3 is a flowchart of an example process (300) for selecting advertisements for display. In general, the process utilizes word-scores for words in a query associated with a user request to determine relevant keywords that are in turn used to identify and select relevant advertisements for display in response the user request. The process (300) can be used, for example, by the advertisement server (110) of FIG. 1 to determine which advertisements (106) should be displayed with a web page (104). In some implementations, the advertisement server (110) is a data processing apparatus that includes one or more processors that are configured to perform actions of the process (300). For example, the data processing apparatus may be the apparatus described in FIG. 5. In some implementations, a computer readable medium can include instructions that when executed by a computing device (e.g., a computer system) cause the device to perform actions of the process (300).

A request for content associated with a query is received (302). In some implementations, the request is a request for an advertisement to be provided with a publisher's resource. For example, the request can be a request for an advertisement or other content item to be provided in a particular content slot that is defined in the publisher's webpage or a content slot that is defined to be presented with search results as depicted in FIG. 2. The request is associated with a query. In some implementations, the query is a string of text submitted by a user, for example, through a web browser (112) interface. In some implementations, the query is meta-data associated with an online resource (e.g., a web page, video, audio, etc.) requested by a user.

The query may include one or more words. The words are extracted (304) from query. A text parser may be used to extract words from the query. For example, words may be delimited within the query by space characters or other designated delimiting characters. For each word extracted from the query, a corresponding word-score is retrieved. Word-scores are metrics based upon user interaction data. In general word-scores may be indicative of the relevance or significance of a word within a query. These word-scores may be stored in a database or another storage device. The storage device may be connected directly to a processing apparatus implementing process (300) or may be accessible via communications over a network (e.g., network (107)). In some implementations, word-scores may be stored in volatile memory in the processing apparatus performing process (300). Word-scores may be determined or updated by the same processing apparatus or by another system. For example, word-scores may be updated using the process described below in relation to FIG. 4. In some implementations, some words may not have a stored word-score associated with them. A default word-score (e.g., 1) may be used for words lacking an associated word-score. Word-scores are typically, but not always, positive real numbers in the range of about 0 to 10. For example, a word that is significant to the meaning of queries, such as a brand name, may have a relatively high value (e.g., around 8 or 9) while a word with that conveys less independent meaning in the query, such as a preposition, may have a relatively low value (e.g., around 0.6). The extraction of words and retrieval of word-scores may be performed by the advertisement server (110).

A list of keywords is generated (306) by deriving keywords from the query. Keywords may be derived from the query by dropping one or more words from the query. In some implementations, keywords may be derived from a query by reordering words from the query. In some implementations, keywords are derived in part by altering or rewriting a word in the query (e.g., substituting a related word with the same root). For example, consider the query 'cheap car rentals'. By dropping different words, the following list of keywords may be generated: {'cheap car', 'cheap rentals', 'car rentals', 'cheap', 'car', 'rentals'}. More keywords may be derived by reordering the words and/or rewriting the words (e.g., 'rent car'). In some implementations, the list of keywords generated includes all permutations of the words in the query. In some implementations, the list includes only a subset of the possible permutations of the words in the query. For example, less keywords may be derived that include a word with a low word-score than are derived including a word with a high word-score. For example, the likelihood of dropping a given word during the keyword derivation process may be inversely proportional to the word-score for the word. In some implementations, the number of keywords derived by keeping a word from the query may be proportional to the word-score for that word. Derivation of keywords in the list may be performed by the advertisement server (110).

The list of keywords for the query may then be filtered (308) using a keyword filtering model. A keyword filtering model classifies keywords as good or bad matches for a query and discards the bad keywords. A keyword filter model may incorporate information from a number of sources and apply that information to make its classifications. For example, a keyword filtering model may base its classification in part upon an inverted document frequency (IDF) for a word in a keyword being classified. An IDF may be based on data about a collection of documents or files to which a query is directed. For example, an IDF may be defined as a logarithm of the number of documents to be searched minus the logarithm of the number of documents including the word. A keyword filter model may incorporate a metric reflecting the quality of a rewrite of one of the query words kept in a keyword. Such a metric would have a high value for simple rewrites that don't significantly alter the meaning of the word (e.g., car→cars)

and could have a relatively low value for rewrites that substantially affect the scope or meaning of the word (e.g., car→SUV). For example, one such metric based on past interaction data for multiple users is a ratio of the click through rate for keywords that include the rewrite to the click through rate for keywords that keep the base word. In some implementations, a keyword filter model may determine a keyword score for each keyword it classifies. For example, a keyword may be classified by comparing its keyword score to a threshold or to the keyword scores for other keywords being considered by the filter.

In some implementations, the keyword filtering model takes word-scores as input and bases its classification of keywords in part on the word-score for a word included in a keyword. In some implementations, the classification of a keyword may be based in part on a word-score for a word in the query that has been dropped from the keyword. For example, a keyword filter may determine a keyword score for a keyword based in part on a word-score for a word in the keyword. The keyword score may be increased by a factor proportional to the word-score for a word in the keyword. In some implementations, a keyword score may be decreased by a factor that is proportional to a word-score for a word in the query that was dropped from the keyword. In some implementations, the keyword filter includes a machine learning module (e.g., a neural network or a support vector machine) that takes one or more word-scores as inputs, along with other possible inputs (e.g., an IDF), and outputs a keyword quality signal. The filtering of keywords may be performed by the advertisement server (110).

After the list of keywords has been filtered (308), the remaining filtered keywords are used to identify (310) a set of candidate advertisements. Candidate advertisements may be associated with keywords that match a filtered keyword. For example, advertisers may specify keywords describing online resources or other content they want their advertisements paired with when they purchase impressions from an online publisher. Keywords may be associated with advertisements or other content items in a database maintained or accessible by the advertisement server (110). The filtered keywords from a query may be used to search a collection of content items for candidates by matching a filtered keyword with a keyword associated with a candidate advertisement. A list of matching advertisements may be generated, where each candidate associated with at least one of the filtered keywords.

Allocation scores are determined (312) for each of the candidate advertisements. Allocation scores may be based on a large number of factors including, for example, characteristics of an impression incident to the request for content (e.g., timing of the request, and characteristics of the user who requested the content, such as demographic information and geographic location), characteristics of a candidate advertisement or a webpage linked by the candidate advertisement, a content publisher's contractual obligation to allocate impressions to a candidate advertisement and time remaining to fulfill that obligation, etc. Allocation scores may be determined using a machine learning system. For example, an allocation score may be a predicted click through rate for advertisement when paired with content in the impression. In some implementations, an allocation score may depend in part on a word-score for a word in the keyword that was matched to the candidate advertisement. For example the allocation score for an advertisement may be increased by a factor that is proportional to a word-score for a word included in the keyword that matched the candidate advertisement. The determination of allocation scores may be performed by the advertisement server (110).

One or more advertisements may be selected (314) and served to a user device that initiated the request. In some implementations, the candidate advertisements may be ranked based on their allocations scores and the advertisements with the highest scores may be selected for provision to the user who initiated the request. In some implementations, the selected advertisement can be provided to a user device that requested the online resource with which the advertisement is being provided. The advertisement can be provided to the user device, for example, over a content delivery network. The advertisement can be provided with presentation instructions that specify a content slot in which the advertisement is to be presented. In turn, the advertisement can be presented on a user device according to the presentation instructions. The selection and serving of advertisements may be performed by the advertisement server (110).

After selected advertisement(s) are served (314), data reflecting a user interaction with the advertisements may be received (316). For example, data reflecting user clicks on advertisements (106) displayed in a web browser interface (200) may be received. In some implementations, data reflecting other types of conversions may be received. For example, information reflecting whether a user consummated a purchase at a website linked by an advertisement may be received. Reception of data reflecting clicks or other conversions may be performed by the advertisement server (110).

Data reflecting the query and resulting user interactions with advertisements is logged (318) for future analysis. For example, a query record may be logged that includes the query, a keyword associated with each advertisement that was selected and provided to the user, and whether or not the each advertisement was clicked by the user. The keyword associated with an advertisement in the log may be a keyword that was matched to a filtered keyword during the identification of candidate advertisements. In some implementations, a query record may include information about other types of user interactions. For example, a query record may include data reflecting other types of conversions, such as a purchase consummated by the user after viewing or clicking an advertisement. In some implementations, the logged query record is stored in a file or a database located on a storage device. The storage device may be connected directly to a processing apparatus implementing process (300) or may be accessible via communications over a network (e.g., network (107)). In some implementations, query records may be stored in volatile memory in the processing apparatus performing process (300). A query record may be logged by the advertisement server (110).

Figure 4:
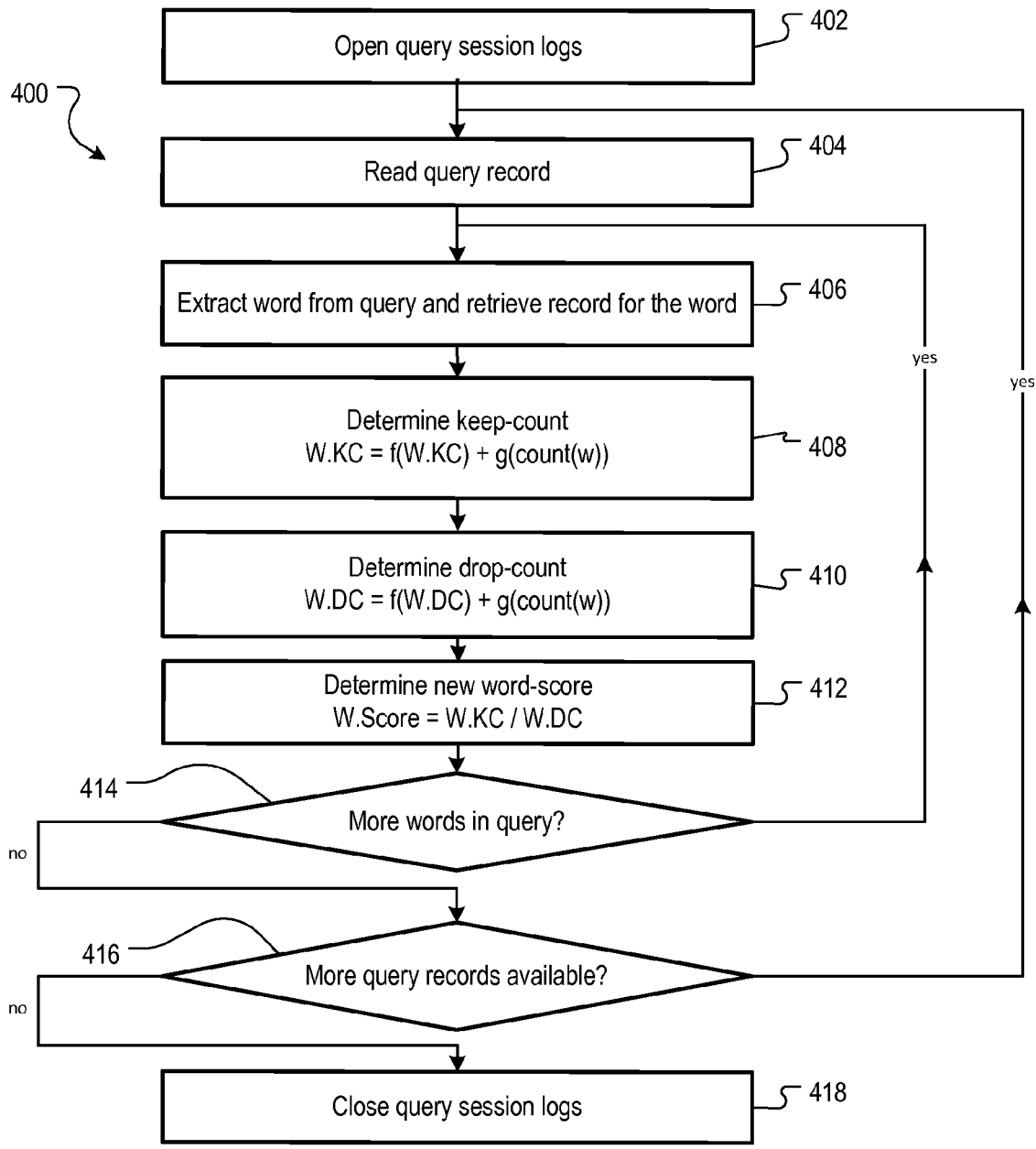
FIG. 4 is a flowchart of an example process for determining scores for words based on past user interaction data.

FIG. 4 is a flowchart of an example process (400) for determining word-scores for words based on past user interaction data. The process (400) can be implemented, for example, by the advertisement server of FIG. 1. Process (400) may be performed periodically (e.g., weekly, daily, hourly, etc.) and/or upon the occurrence of an event. For example, process (400) may be performed when the number of unprocessed query entries in a query session log or database exceeds and threshold or when an operator of the advertisement server (110) initiates an update. Generally, a system making less frequent updates of the word-scores may be more computationally efficient, so there may be a tradeoff between using the most current and accurate word-scores and reduced complexity associated with a lower frequency of updates.

Operations of the process (400) may include opening (402) query session logs. Query session logs may be stored in a file or a database located on a storage device. The storage device may be connected directly to a processing apparatus implementing process (400) or may be accessible via communications over a network (e.g., network (107)). Opening the query session log may include establishing a communications session with database running on a remote storage device. In some implementations, query records may be stored in volatile memory in the processing apparatus performing process (400). Query session logs may be opened by the advertisement server (110).

Once the query session logs have been opened (402), query records may be read (404) and processed. As discussed above, query records may include the query, a keyword associated with each advertisement that was selected and provided to the user, and whether or not the each advertisement was clicked by the user. In some implementations, a query record may include information about other types of user interactions. A query record may include data reflecting other types of conversions, such as a purchase consummated by the user after viewing or clicking an advertisement.

For each query record, the query may be parsed to extract (406) one or more words from the query. Once a word is extracted from the query, an object or record corresponding to the word is accessed. The word object may include a word-score for the word or other state variables that may be used to determine the current word-score for the word. These records or objects may be stored on a remote storage device accessible via communications over a network (e.g., network (107)). In some implementations, the records or objects associated with words are stored in volatile memory on a device performing process (400), such as the advertisement server (110).

The new word-score may be determined in a variety of ways. The new word-score for the word may depend on a keep-count for the word. A keep-count is a state variable used to compute the word-score that is indicative of the frequency with which users have interacted with (e.g., clicked on) content items (e.g., advertisements) associated with a keyword that includes the word. In some implementations the keep-count is a count of the number of clicks on advertisements associated with a keyword including the word. In some implementations, the keep-count is a count of the number clicks on advertisements associated with keywords that drop all words from a query except the word. In some implementations, the keep-count is an aggregate or average click through rate for advertisements associated with keywords that include the word. In some implementations, the keep-count is an estimate of the number of clicks expected for advertisements served in response to the query and associated with a keyword that includes the word. For example, the keep-count may be an average of the predicted click through rates for the advertisements served in response to the query and associated with a keyword that includes the word. This implementation receives its information regarding user behavior indirectly from a machine learning system that generates the predicted click through rates and is dependent on the performance of that system, but has the advantage of being less sensitive to low sample size associated with low levels of user interactivity in the dataset. In some implementations, the keep-count may be based in part on data reflecting other types of conversions, such as user consumption of a purchase through website linked by an advertisement.

Similarly, the new word-score may depend on a drop-count for the word. A drop-count is a state variable used to compute the word-score that is indicative of the frequency with which users have interacted with (e.g., clicked on) advertisements associated with a keyword that dropped the word from the query. In some implementations, the drop-count is a count of the number of clicks on advertisements associated with a keyword that dropped the word. In some implementations the drop-count is a count of the number clicks on advertisements associated with keywords that drop all words from a query except a word distinct from the word. For example, upon receiving the query "cheap car rentals", the drop-count may be updated based on the number of clicks on advertisements associated with the keyword "car" or the keyword "rentals." In some implementations, the drop-count is an aggregate or average click through rate for advertisements associated with keywords that dropped the word from the query. In some implementations, the drop-count is an estimate of the number of clicks expected for advertisements served in response to the query and associated with a keyword that dropped the word. For example, the drop-count may be an average of the predicted click through rates for the advertisements served in response to the query and associated with a keyword that dropped the word. In some implementations, the drop-count may be based in part on data reflecting other types of conversions, such as user consumption of a purchase through website linked by an advertisement.

The new word-score may be determined by comparing the keep-count and the drop-count for a word. For example, the word-score may be calculated by dividing the keep-count by the drop-count. In some implementations, a word-score may be calculated as a logarithm of the ratio of a keep-count to a drop-count. The drop-count may be biased by a small positive value (e.g., 0.001) to avoid a singularity in the word-score calculation. In some implementations, the word-score may be a function of the keep-count alone. For example, the word-score may be directly proportional to the word-score. In some implementations, the word-score may be a function of the drop-count alone. For example, the word-score may be inversely proportional to a biased drop-count.

The keep-count for the word may be determined (408). The previous keep-count may be stored as part of the object or record associated with a word. The new keep-count may be determined based in part on the old keep-count and on data gathered from the current query record. For example, the new keep-count may be determined as a sum of the old keep-count with the keep-count for data in the current query record. In some implementations, the keep-count for the current query record may be input to a digital filter that outputs the current keep-count for the word. The state of the digital filter may be stored in the object or record associated with the word. The digital filter may determine the new keep-count for the word in accordance with Equation (1):

$$W \cdot KC = f(W \cdot KC) + g(\text{count}(w)) \quad (1)$$

where w is the word, count( ) is a function that returns the keep-count for w in the current query record, f( ) and g( ) are mappings or functions, W is the object associated with w, and W·KC is a state variable stored in the object reflecting the keep-count for the word across multiple records or users which is updated in accordance with Equation (1). For example, f( ) and g( ) may be linear scale factors (e.g., f(x)= 0.9*x, g(y)=0.1(y)), thus implementing a linear first order recursive filter. In some implementations, a higher order digital filter may be used and W·KC is a vector of state variables. Digital filtering may be used to incorporate data reflecting user interactions across multiple sessions and users. In some implementations (not shown), the keep-count may be determined from scratch each time the word score is determined by collecting data for all users within a sliding analysis window of time and taking the ratio between the sum of all clicks on content items associated with keywords that keep the word and the sum of all impressions for such content items. The keep-count may be determined by the advertisement server (110).

The drop-count for the word may be determined (410) in a similar manner. The previous drop-count may be stored as part of the object or record associated with a word. The new drop-count may be determined based in part on the old drop-count and on data gathered from the current query record. For example, the new drop-count may be determined as a sum of the old drop-count with the drop-count for data in the current query record. In some implementations, the drop-count for the current query record may be input to a digital filter that outputs the current drop-count for the word. The state of the digital filter may be stored in the object or record associated with the word. The digital filter may determine the new drop-count for the word in accordance with Equation (2):

$$W \cdot DC = u(W \cdot DC) + v(\text{count}(w)) \quad (2)$$

where w is the word, count( ) is a function that returns the drop-count for w in the current query record, u( ) and v( ) are mappings or functions, W is the object associated with w, and W·KC is a state variable stored in the object reflecting the drop-count for the word across multiple records or users which is updated in accordance with Equation (2). For example, u( ) and v( ) may be linear scale factors (e.g., $f(x)=0.9*x$, $g(y)=0.1(y)$), thus implementing a linear first order recursive filter. In some implementations, a higher order digital filter may be used and W·KC is a vector of state variables. In some implementations (not shown), the drop-count may be determined from scratch each time the word score is determined by collecting data for all users within a sliding analysis window of time and taking the ratio between the sum of all clicks on content items associated with keywords that drop the word and the sum of all impressions for such content items. The drop-count may be determined by the advertisement server (110).

The word-score for the word may be determined (412). The word-score may be determined in part by comparing the keep-count to the drop-count. For example, the word-score may depend on the ratio of the keep-count to the drop-count for the word. In some implementations, the word-score may be determined in accordance with Equation (3):

$$W \cdot \text{Score} = h(W \cdot KC / W \cdot DC) \quad (3)$$

where h( ) is a mapping or function and W·Score is the word-score for the word or a group of related words associated with the object W. For example, h( ) may be a linear scale factor (e.g., $h(x)=1*x$). In some implementations, h( ) is a logarithm (e.g., the natural logarithm). The word-score may be determined by the advertisement server (110).

A check (414) can be performed to determine if there are more words from the query that still need to be processed. If so the next word is processed, until all words have been processed. After the last word is processed, a check (416) can be performed to determine if any other query records are available. If so the next query record is processed, until all available records have been processed. After the last query record is processed the query session logs are closed (418) and process (400) terminates.

Figure 5:
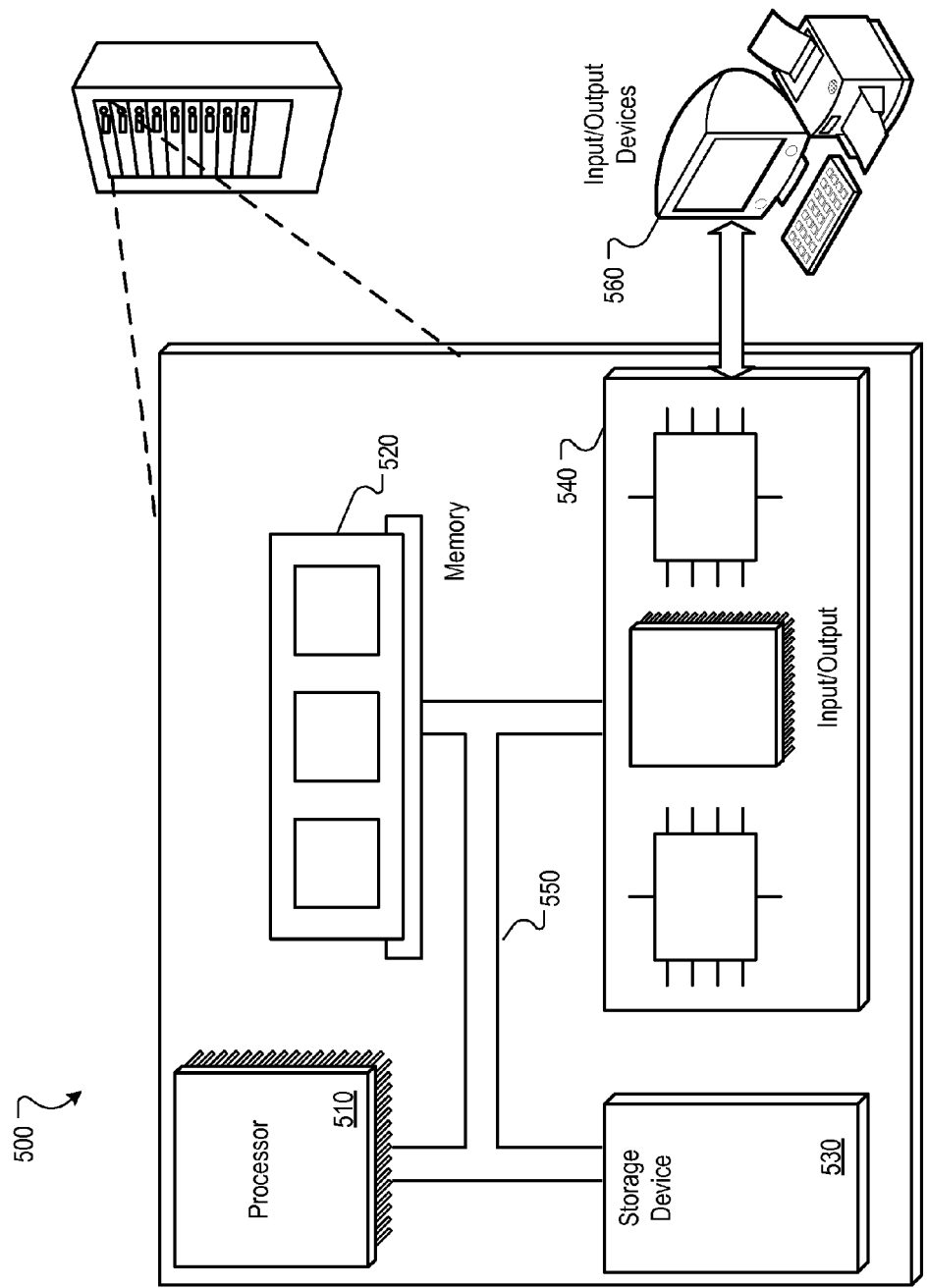
FIG. 5 is block diagram of an example computer system that can be used to facilitate the display of advertisements.

FIG. 5 is block diagram of an example computer system (500) that can be used to facilitate display of advertisements. The system (500) includes a processor (510), a memory (520) a storage device (530), and an input/output device (540). Each of the components (510, 520, 530, and 540) can be interconnected, for example, using a system bus (550). The processor (510) is capable of processing instructions for execution within the system (500). In one implementation, the processor (510) is a single-threaded processor. In another implementation, the processor (510) is a multi-threaded processor.

The processor (510) is capable of processing instructions stored in the memory (520) or on the storage device (530).

The memory (520) stores information within the system (500). In one implementation, the memory (520) is a computer-readable medium. In one implementation, the memory (520) is a volatile memory unit. In another implementation, the memory (520) is a non-volatile memory unit.

The storage device (530) is capable of providing mass storage for the system (500). In one implementation, the storage device (530) is a computer-readable medium. In various different implementations, the storage device (530) can include, for example, a hard disk device, an optical disk device, or some other large capacity storage device.

The input/output device (540) provides input/output operations for the system (500). In one implementation, the input/output device (540) can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices (560). Other implementations, however, can also be used, such as mobile computing devices, mobile communication devices, set-top box television client devices, etc.

In some implementations (not shown), filtered keywords are used to match keywords associated with result snippets stored in an indexed cache. For example, the query may be string of text submitted by a user to a search engine. The keywords may occur in indexed result snippets. The match of filtered keywords may be used to identify highly relevant search results. In some implementations, a word-score may be used may be used to rank result snippets returned by a search engine. For example, the position of a result snippet within a search result (206) may be determined in part based on the word-score of word occurring in a query and occurring in or otherwise associated with the result snippet.

The web server and advertisement server can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method performed by one or more data processing apparatus, the method comprising:
   receiving a first query associated with a user request;
   determining a score for a word in the first query based at least in part on a first count of activities representing user interaction with content items served for display in response to a past query that included the word and a second count of activities representing user interaction with content items served for display in response to another past query that did not include the word;
   selecting a keyword derived from the first query based at least in part on the score; and
   identifying candidate content items using the selected keyword.

2. The method of claim 1, further comprising:
   deriving the keyword from the first query in part by dropping the word from the first query.

3. The method of claim 1, further comprising:
   selecting one of the candidate content items that matches the keyword; and
   transmitting information reflecting the one of the candidate content items to a user device.

4. The method of claim 1, wherein one of the candidate content items is an advertisement.

5. The method of claim 1, wherein one of the candidate content items is a search result snippet.

6. The method of claim 1, wherein determining the score comprises:
   determining a first count of clicks on content items that were associated with keywords derived from the past query that included the word; and
   determining a second count of clicks on content items that were associated with keywords derived from the past query that did not include the word.

7. The method of claim 6, wherein determining the score further comprises determining a ratio of the first count to the second count.

8. The method of claim 1, wherein determining the score comprises:
   determining a first click through rate for a first keyword derived from the past query that included the word; and determining a second click through rate for a second keyword derived from the past query that did not include the word.

9. The method of claim 8, wherein determining the second click through rate comprises dividing a first count of clicks on content items that were associated with the second keyword by a second count of a number of content items that were associated with the second keyword and transmitted to a user device.

10. The method of claim 1, wherein determining the score comprises:
   determining a first average click through rate for keywords derived from the past query that included the word; and
   determining a second average click through rate for keywords derived from the past query that did not include the word.

11. The method of claim 10, wherein determining the score further comprises determining a ratio of the first average click through rate to the second average click through rate.

12. The method of claim 1, wherein determining the score comprises:
   determining a first count of clicks on content items that were associated with single word keywords derived from the past query that included the word; and
   determining a second count of clicks on content items that were associated with single word keywords derived from the past query that did not include the word.

13. The method of claim 12, wherein determining the score further comprises determining a ratio of the first count to the second count.

14. A system, comprising:
   one or more data processing apparatus; and
   a memory coupled to the one or more data processing apparatus having instructions stored thereon which, when executed by the data processing apparatus cause the data processing apparatus to perform operations comprising:
   receiving a first query associated with a user request;
   determining a score for a word in the first query based at least in part on a first count of activities representing user interaction with content items served for display in response to a past query that included the word and a second count of activities representing user interaction with content items served for display in response to another past query that did not include the word;
   selecting a keyword derived from the first query based at least in part on the score; and
   identifying candidate content items using the selected keyword.

15. The system of claim 14, wherein the operations further comprise:
   deriving the keyword from the first query in part by dropping the word from the first query.

16. The system of claim 14, wherein the operations further comprise:
   selecting one of the candidate content items that matches the keyword; and
   transmitting information reflecting the one of the candidate content items to a user device.

17. The system of claim 14, wherein one of the candidate content items is an advertisement.

18. The system of claim 14, wherein one of the candidate content items is a search result snippet.

19. The system of claim 14, wherein determining the score comprises:
   determining a first count of clicks on content items that were associated with keywords derived from the past query that included the word; and
   determining a second count of clicks on content items that were associated with keywords derived from the past query that did not include the word.

20. The system of claim 19, wherein determining the score further comprises determining a ratio of the first count to the second count.

21. Non-transitory computer readable media storing software comprising instructions, executable by one or more processing device, that upon such execution cause the processing device to perform operations comprising:
   receiving a first query associated with a user request;
   determining a score for a word in the first query based at least in part on a first count of activities representing user interaction with content items served for display in response to a past query that included the word and a second count of activities representing user interaction with content items served for display in response to another past query that did not include the word;
   selecting a keyword derived from the first query based at least in part on the score; and
   identifying candidate content items using the selected keyword.

22. The computer readable media of claim 21, wherein instructions also cause the processing device to perform operations comprising:
   deriving the keyword from the first query in part by dropping the word from the first query.

23. The computer readable media of claim 21, wherein instructions also cause the processing device to perform operations comprising:
   selecting one of the candidate content items that matches the keyword; and
   transmitting information reflecting the one of the candidate content items to a user device.

24. The computer readable media of claim 21, wherein one of the candidate content items is an advertisement.

25. The computer readable media of claim 21, wherein one of the candidate content items is a search result snippet.

26. The computer readable media of claim 21, wherein determining the score comprises:
   determining a first count of clicks on content items that were associated with keywords derived from the past query that included the word; and
   determining a second count of clicks on content items that were associated with keywords derived from the past query that did not include the word.

27. The computer readable media of claim 26 wherein determining the score further comprises determining a ratio of the first count to the second count.

28. A system, comprising:
   means for receiving, at one or more processor, a first query associated with a user request;
   means for determining a score for a word in the first query based at least in part on a first count of activities representing user interaction with content items served for display in response to a past query that includes the word and a second count of activities representing user interaction with content items served for display in response to another past query that does not include the word, wherein the means for determining the score includes a processor;

means for selecting a keyword derived from the first query based at least in part on the score, wherein the means for selecting the keyword includes a processor; and means for identifying candidate content items using the selected keyword, wherein the means for identifying the content items includes a processor.

29. The system of claim 28, further comprising:

means for deriving the keyword from the first query in part by dropping the word from the first query.

30. The system of claim 28, further comprising:

means for selecting one of the candidate content items that matches the keyword; and means for transmitting information reflecting the one of the candidate content items to a user device.

31. The system of claim 28, wherein one of the candidate content items is an advertisement.

32. The system of claim 28, wherein the one of the candidate content items is a search result snippet.

33. The system of claim 28, wherein determining the score comprises:

determining a first count of clicks on content items that were associated with keywords derived from the past query that included the word; and determining a second count of clicks on content items that were associated with keywords derived from the past query that did not include the word.

34. The system of claim 33, wherein determining the score further comprises determining a ratio of the first count to the second count.

* * * * *